United States Patent
Craft et al.

(10) Patent No.: US 9,787,792 B1
(45) Date of Patent: *Oct. 10, 2017

(54) NETWORK CACHE ACCELERATOR

(71) Applicant: Alacritech, Inc., San Jose, CA (US)

(72) Inventors: Peter K. Craft, San Francisco, CA (US); Clive M. Philbrick, San Jose, CA (US); David A. Higgen, Apopka, FL (US)

(73) Assignee: Alacritech, Inc., San Jose, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/736,548

(22) Filed: Jun. 11, 2015

Related U.S. Application Data

(63) Continuation of application No. 13/664,720, filed on Oct. 31, 2012, now Pat. No. 9,088,592.

(60) Provisional application No. 61/556,999, filed on Nov. 8, 2011.

(51) Int. Cl.
*H04L 29/08* (2006.01)
*H04L 12/747* (2013.01)
*H04L 29/06* (2006.01)
*G06F 12/0802* (2016.01)

(52) U.S. Cl.
CPC ...... *H04L 67/2842* (2013.01); *G06F 12/0802* (2013.01); *H04L 67/06* (2013.01); *H04L 67/1097* (2013.01); *H04L 69/16* (2013.01); *H04L 69/26* (2013.01)

(58) Field of Classification Search
CPC .. H04L 67/1097; H04L 67/2842; H04L 69/26
See application file for complete search history.

(56) References Cited

U.S. PATENT DOCUMENTS

| 9,088,592 B1 | 7/2015 | Craft et al. |
| 2003/0140124 A1 | 7/2003 | Burns |
| 2004/0133634 A1 | 7/2004 | Luke et al. |
| 2004/0146054 A1* | 7/2004 | Golshan ................. H04L 29/06 370/395.52 |
| 2008/0040519 A1 | 2/2008 | Starr et al. |
| 2009/0182945 A1* | 7/2009 | Aviles ..................... H04L 69/16 711/122 |

* cited by examiner

*Primary Examiner* — Aaron Strange
(74) *Attorney, Agent, or Firm* — Mark Lauer; Silicon Edge Law Group LLP

(57) ABSTRACT

A network host such as a caching device is disclosed that greatly increases the speed with which a server reads and writes data for clients. The host may include a specialized network interface that not only processes TCP but also parses received network file system headers, identifying those headers within the TCP data stream, separating them from any corresponding network file system data, and providing them separately from that data to the network file system of the host for processing as a batch, all without any interrupt to the host. Similarly, the network file system of the host may communicate directly with the network interface by writing network file system headers directly to a register of the network interface to transmit data.

16 Claims, 5 Drawing Sheets

NETWORK CACHE ACCELERATOR

REFERENCE TO RELATED APPLICATION

The present application is a continuation of application Ser. No. 13/664,720, filed Oct. 31, 2012, which in turn claims the benefit under 35 U.S.C. 119(e) of Provisional Patent Application 61/556,999, filed Nov. 8, 2011, both of which have the same title and inventors as the present application and are incorporated by reference herein.

FIELD OF THE INVENTION

The present application relates to computer network systems and devices, such as servers that store data for clients, network caching systems and related network data processing.

BACKGROUND INFORMATION

A common commercially available network server may achieve about 40,000 input/output operations per second (IOPS) using a pair of computers in a failover configuration with a few hundred disk drives. Although the large number of drives provides a large storage capacity, another reason for the large number of drives is to provide many disk drive heads for accessing data quickly on the rotating disks. Still, reading from and writing to server disk drives can limit client access speed. Employing flash memory for caching in addition to dynamic random access memory (DRAM) can reduce the number of drives by about one-quarter, but the server may still be limited at about 40,000 IOPS due to the speed of the processors and other constraints. Using such flash memory may improve read access speed but writing to flash memory may still be relatively slow.

Protocol processing can present another roadblock to server speed. One of the most common protocols for data transfer is Transmission Control Protocol (TCP). TCP has been employed for decades and has increased in popularity, or at least in usage, over the years. An advantage of TCP is its guaranteed delivery of error free data; however, this guarantee comes with a price of greater complexity relative to some other network protocols. Such complexity can slow TCP communication, or at least make it difficult for TCP to be used as network data rates increase, for example from 100 Mb/s ten years ago to 10 Gb/s currently. Moreover, even for a 100 Mb/s transmission line rate that was conventional ten years ago, TCP processing at the endpoints of the network proved to be a bottleneck that slowed network communication, as well as consumed inordinate CPU cycles.

A solution to the TCP bottleneck was provided by Alacritech, Inc., which offloaded established TCP connections from the host CPU to hardware that could process data transfer much more rapidly, significantly increasing TCP data transfer rates while reducing CPU utilization. Processing of packets for offloaded TCP connections was termed "fastpath," whereas protocol processing of non-TCP packets, as well as of TCP packets for which the TCP connection had not been offloaded, was termed "slowpath." Descriptions and claims to such a solution can be found in multiple patents, including U.S. Pat. Nos. 7,337,241; 7,284,070; 7,254,696; 7,237,036; 7,191,318; 7,191,241; 7,185,266; 7,174,393; 7,167,927; 7,167,926; 7,133,940; 7,124,205; 7,093,099; 7,089,326; 7,076,568; 7,042,898; 6,996,070; 6,965,941; 6,941,386; 6,938,092; 6,807,581; 6,757,746; 6,751,665; 6,697,868; 6,687,758; 6,658,480; 6,591,302; 6,470,415; 6,434,620; 6,427,173; 6,427,171; 6,393,487; 6,389,479; 6,334,153; 6,247,060; and 6,226,680, which are incorporated by reference herein.

For a situation in which an application is running on a host CPU while a TCP connection for that application is handled by a network interface card (NIC), however, communications between the host and the device could sometimes hamper performance. For example, to receive data for an offloaded connection, the network interface card would "indicate" a small amount of data that included a session layer header to the host. The host would move that small amount of data, via the device driver and the host's TCP/IP stack, to the application, which would then process the session layer header to allocate buffers for the data corresponding to the session layer header. The card could then place the data, by direct memory access (DMA), into the buffers allocated by the application, so that the host CPU could completely avoid copying the application data. This was sometimes termed a "zero-copy receive."

Zero-copy receive works particularly well for receiving relatively large blocks of data transported in multiple packets, in which case the data can be placed in a destination with relatively few interrupts. But for relatively small blocks of data transported in one or two packets, the interrupts generated when the session layer headers and data cross an input/output (I/O) bus can impair performance.

The most common network file system applications that use TCP, such as Server Message Block (SMB) and Common Internet File System (CIFS), Network File System (NFS), and Internet Small Computer System Interface (iSCSI), all have certain aspects in common. Data sent by a client (or initiator) to a server (or target), may be comprised of a session layer header (sometimes called an application header), possibly followed by session layer data (sometimes called application data). When session-layer data exists, the session layer header describes the nature and length of the data. Since these session layer headers and data exist within the TCP data stream, they can be located anywhere in the received TCP packet.

Because TCP is a byte-stream protocol that is designed to deliver data in the correct order to the applications above it, which are designed to process that data in order, having session layer headers located anywhere in received TCP packet is usually immaterial, because the application simply processes the data in order as it works its way through packets. But an issue exists for offloaded TCP, because for relatively small session layer blocks the transfer of session layer headers and data into the host can result in increased interrupts.

Further issues exist in processing TCP and network file system data by multiprocessor computers, especially for offloaded TCP connections. While multiple processors provide more raw processing power than a single processor that is limited in clock speed, arranging jobs for those processors to work on and providing data from memory for those jobs can slow network communication and file system processing. Although techniques such as hyperthreading have been developed to deal with such issues, additional processors may provide diminishing returns in the quest for increasing IOPS.

SUMMARY OF THE INVENTION

In one embodiment, a network host such as a caching device is provided that greatly increases the speed with which a server reads and writes data for clients. The host may include a specialized network interface that not only processes TCP but also parses received network file system headers, identifying those headers within the TCP data stream, separating them from any corresponding network file system data, and providing them separately from that data to the network file system of the host for processing as a batch, all without any interrupt to the host. Similarly, the network file system of the host may communicate directly with the network interface by writing network file system headers directly to a register of the network interface to transmit data.

Such a caching device may essentially sit between the server or servers and the clients, coupled to each by a network link. The caching device may have multiple processors and provide tiered cache storage for the server. In a first tier, the caching device may utilize DRAM for reading and writing data such as files that have most recently been accessed by the clients. In a second tier, the caching device may utilize flash memory such as solid state drives (SSDs) that hold data that has been accessed recently but may no longer be stored in DRAM. A caching algorithm is employed as part of a cache manager program running on the caching device to determine what data is cached and how it is cached.

In one embodiment, a multiprocessor caching device may accelerate cache reads by delegating a processor of the caching device to a TCP control block (TCB) on the network interface, ensuring that the read is not delayed while the network protocol context for that read is switched between processors as is conventional. The caching device may increase the speed with which a server writes data by offloading the server of most read traffic and freeing the server's CPUs to work on write requests, so that write requests are accelerated even though they are completed by the server. Moreover, the caching device may receive data much more quickly than conventional hosts, due to acceleration in network protocol processing and network file system processing. In addition, mapping between client and server logical connections on the network interface and processors on the caching device further reduces spin locks and cache line misses, further increasing IOPS.

The server maintains a copy of all the data on the caching device, and may be accessed for any data that is not cached on the caching device. Because the server has a copy of all the data that is on the caching device, the cache manager program need not contain a file system, allowing the caching device to more quickly access cache storage for clients. That is, a namespace hierarchy for all of the files on the server need not be maintained on the caching device, and files or portions of files stored on the caching device may simply be organized by temporary file handles. In the event of failure of the caching device, the server has a copy of any files that were on the caching device. In one embodiment, a second caching device may be supplied to provide failover of the caching device. In another embodiment, a host that employs some of the innovations described herein may act as a server rather than a caching device intermediary for a server, in which case the host includes a file system and multiple disk drives for long term storage, as well as DRAM and SSDs for caching data.

As mentioned above, one or more specialized network interfaces for the caching device may be provided, which can perform the vast majority of network protocol processing for the caching device, alleviating that processing for the caching device. In one embodiment, the network interface communicates directly with the network file system of the caching device. For example, network file system headers received and parsed by the network interface may be stored by the interface in a memory of the caching device, and the network file system program of the caching device may periodically poll another part of its memory for interface notifications that the network file system headers and any related data are available for processing. Thus, data structures from the network interface for received data are untouched by the network and transport layers of the caching device, those data structures being directly accessible by the network file system. Similarly, transmission of data by the caching device may involve the network file system writing directly to a register on the network interface, avoiding the network and transport layers of the caching device.

In one embodiment, received network packets are processed by TCP on the network interface, and NFS headers along with related Remote Procedure Call (RPC) headers are identified within the TCP payload, even when those headers are not aligned at the beginning of the TCP payload. The NFS/RPC headers are parsed by the network interface and separated from the NFS data. The NFS/RPC headers and data are provided separately by the network interface to the caching device, although NFS/RPC headers that correspond to the NFS data may be linked with the data by pointers or the like. In one embodiment, the caching device allocates first and second sets of buffers from separate memory areas so that received NFS/RPC headers can be stored in the first set of buffers (called MTU buffers) and NFS data can be stored in the second set of buffers (called cache buffers). Once all the NFS data corresponding to an NFS/RPC header has been placed in respective buffers by the network interface a receive event structure may be sent from the network interface to the caching device informing the latter that a complete NFS event has been received, and allowing the caching device to identify the NFS/RPC header and any corresponding data.

In one embodiment the network file system of the caching device may periodically look for receive events by polling a receive event queue. The network file system then accesses the data structures that contain the network file system headers and corresponding network file system data to process requests (e.g., READ, WRITE, LOOKUP, GETATTR) on behalf of the server. The network file system can process the network file system headers as a batch, and in the polling embodiment avoids interrupts for any of the headers, which can be especially useful for network file system headers that do not have linked network file system data, and for network file system headers that are linked to relatively small amounts of network file system data. For other network file system headers in such a batch that are linked to relatively large amounts of network file system data, the processing of those headers and their linked data provides efficient transfer of large or small blocks of network file system data, and avoids any network or transport layer copying by the caching device. In another embodiment, batch processing of network file system headers avoids separate interrupts for each of the headers, but a single interrupt may be generated for the whole batch.

For an embodiment in which the caching device employs multiple logical processors, further efficiencies can be attained by requiring that for each TCP connection with a client that is maintained on the network interface, only one of the logical processors is involved in network file system processing corresponding to that connection. This avoids the need for context locks that traditionally are used when, for example, a first processor processes received data for a particular connection and a second processor processes transmitted data for that same connection. Commonly, such context locks are used because an application scheduler on a host would allocate processor tasks, such as sending network data, based on various factors other than whether the tasks involved a particular network connection, and so the processor sending data for a particular connection would likely be different than the processor receiving data for that connection. Note that, although a client TCP connection on the network interface may be associated with only one of the caching device processors, there may be multiple such TCP connections on the network interface associated with each processor.

For an embodiment in which the caching device is coupled to the server by a network, a somewhat different form of processor-connection affinity may be employed. In one case, a one-to-one correspondence between each of the processors and a respective TCP connection with the server can be initialized and maintained by the caching device and the network interface. For instance, if the caching device contains sixteen logical processors, then sixteen TCP connections may be established and maintained on the network interface for communication with the server, with each server connection specific to one processor and each processor specific to one server connection. If the network interface includes plural network cards, then a server TCB may be maintained on each card corresponding to each processor. Similarly, if the caching device is coupled to a plurality of servers, a TCP connection may be maintained on the network interface for each processor-server combination. And if the server or servers has more than one mountpoint, then a TCP connection may be maintained on the network interface for each processor-server-mountpoint combination or for each processor-server combination.

This correspondence is particularly advantageous in combination with the configuration discussed above for which each client TCP connection on the network interface is associated with only one processor on the caching device. For example, data writes by a client to the server via the caching device, and data reads from the server by the client via the caching device, may all be processed by the same processor on the caching device, along with various control items such as requests and acknowledgements communicated for the writes and reads, all without locking or switching the processor. Thus, a request that is received from a client and forwarded to a server can be redirected to one of the sixteen server connections without switching processors or introducing connection locks. The same is true for a response from the server that is forwarded to a client. Similarly, processor cache hits (i.e., the processor's access to its internal cache) are much more likely when a single processor performs all of the network file system and file system processing for a particular network connection. And in the case of a processor cache miss, fetching the needed cache line is quicker due to the processor-connection affinity, as compared with the typical situation in which the cache line may have been modified by another processor.

In one embodiment, the logical processors of the caching device each may execute a single process, which is stored as a single call stack, eliminating context switching. This reduces the amount of state that must otherwise be stored and retrieved for a process to sleep or wakeup. In one embodiment, a replay queue is employed that stores a list of tasks that have been suspended due to lack of necessary information, so that when the information is available the task is replayed rather than resumed from the point at which it was suspended, greatly reducing the state that must be stored. This single stack operation works synergistically with the processor affinity described above to keep the logical processors running with minimal wasted cycles.

In one embodiment, a Non-Uniform Memory Architecture (NUMA) may be employed, which can work in concert with the processor-connection affinity. In this case, the memory access time depends on the memory location relative to a processor. With NUMA, a processor can access its own local memory faster than non-local memory, that is, memory local to another processor or memory shared between processors. For example, the MTU buffers may be allocated to the network interface from memory that is local to the processor that corresponds to the network connection, whereas the cache buffers may be allocated from memory that is local to the I/O bus and DMA units of the network interface. This is because the file data for both writes and reads is not copied or otherwise touched by any caching device processor, but is stored to and retrieved from cache buffers on the caching device by the DMA units of the network interface. In contrast, the network file system headers benefit from storage local to the processor corresponding to the network connection. Similarly, the socket structure for that network connection is maintained adjacent to the only processor that accesses the socket structure. In one embodiment, the socket structure for a network connection between a client and the caching device may include an identification of the socket structure for the network connection between the server and the caching device.

DETAILED DESCRIPTION

Figure 1:
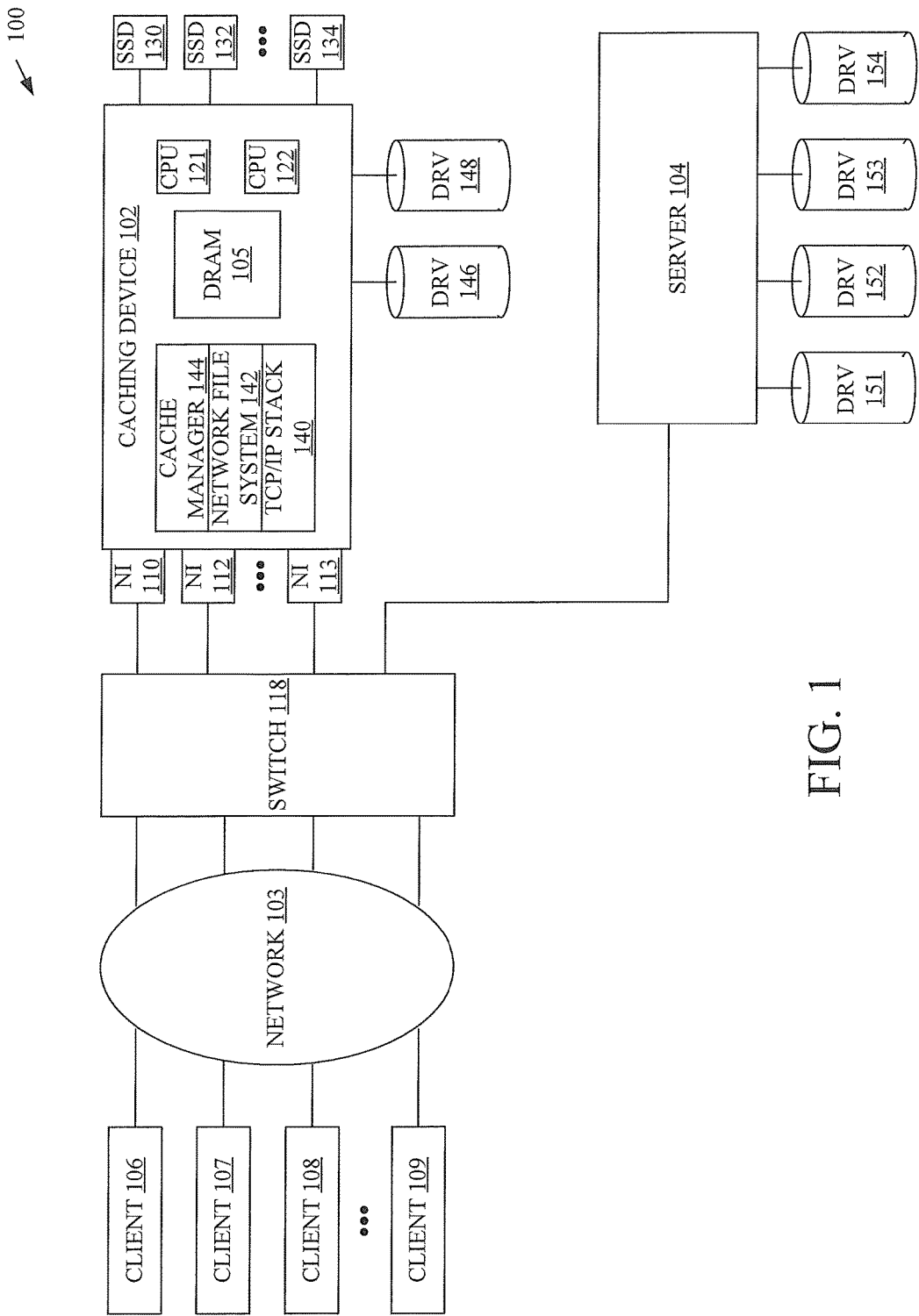
FIG. 1 is a schematic diagram of a system that includes a caching device that is coupled to a server and clients.

FIG. 1 is a schematic diagram of an embodiment of a system 100 that includes a caching device 102 that is coupled to a server 104 that stores data for clients 106-109. At least one network 103, which may include a switch 118, couples clients 106-109 to server 104 and caching device 102. Network interfaces 110, 112 and 114 couple caching device 102 to network 103. The multiprocessor caching device 102 may be disposed between clients 106-109 and server 104 on the network 103, so that communications between clients 106-109 and server 104 are routed through the caching device. Caching device 102 contains at least two physical processors 121 and 122, DRAM 105, optional disk drives 146 and 148, and solid-state drives 130, 132, 133 and 134. Although two physical processors are illustrated for clarity, many more processors may be provided on the caching device to work on network communications. For example, each CPU 121 and 122 may have four cores, resulting in eight physical processors. Each of the eight physical processors may be hyperthreaded, so that for each of the eight physical processors the operating system sees two logical processors, resulting in a total of sixteen logical processors. Furthermore, certain embodiments discussed below may provide scalability that allows for more processors than is common.

Programs stored on computer readable media such as DRAM 105 and running on processors 121 and 122 include a protocol processing stack 140 that at least has a network layer such as IP and a transport layer such as TCP, a network file system 142 that handles an application layer of the TCP/IP model (layers 5-7 of the OSI model), and cache manager program 144. Server 104 may have multiple disk drives 151-154 that store data for clients. Although a single server 104 is illustrated to facilitate understanding, a caching device may in one embodiment provide caching functions for several servers. Similarly, although a few disk drives 151-154 are illustrated to facilitate understanding, server 104 may actually be connected to hundreds of such drives. Further, as is well known, plural mounts for the drives may be employed.

Cache manager program 144 includes algorithms that govern how requests (e.g., READ, WRITE, LOOKUP, GETATTR) from clients 106-109 to server 104 are cached and accessed on caching device 102. For example, a request from a client for a file or portion of a file from the server may be handled by the cache manager 144 by first looking to see whether the caching device 102 has a copy of that file or file portion in its DRAM 105. In a NFS embodiment, the file may be identified by a binary filehandle on the caching device, which is a unique and persistent reference to the file on the caching device that is independent of the pathname of the file on the server. A table of filehandles may be stored on the caching device. A request from a client to the server that is received at the caching device may be processed by the network interface and network file system on the caching device, as described in detail below, and a filehandle extracted from the request, for comparison with the table of filehandles.

For a client write request to store a new file on the server, the filehandle contained in the request and stored on the caching device may reference the directory on the server in which the file will be stored. A filehandle for the initial directory on the server from which all other directories for this file system are derived may be created through the MOUNT protocol. Once the server has written the new file to the directory, it returns a filehandle to the caching device and client, which may be used by the caching device in the future for read or write requests for that file by the client or other clients. In one embodiment, the filehandle may be stored on the caching device in a data structure called an nnode, along with the attributes of the file and pointers or other links to any file data that is cached on the caching device. Each nnode on the caching device represents a file or directory of the server that is stored on the caching device, and contains a filehandle, file attributes and pointers to information. The pointers may identify, for example, DRAM or SSD buffers, directory entries or symlinks that redirect to such information.

The data for the file, if any, that was received with the initial request to store the new file on the server is stored in DRAM 105 that is associated with the filehandle. That data may also be cached in a solid state drive of the caching device, such as SSD 130, either shortly after the data has been cached in DRAM 105 or at a later time when the data may be bumped from DRAM 105 due to inactivity and the need to cache more recently accessed data in DRAM 105. A least recently used (LRU) algorithm may be used by the caching device to determine which data to discard from DRAM and to cache in flash memory, if not already cached in flash memory, when new data is cached in DRAM.

When a client requests to read a file or portion of a file on the server that has been cached on the caching device, the filehandle contained in the request as well as the offset and length of the data being requested is determined by the network file system of the caching device. The filehandle parsed from the request is used to look up the nnode on the caching device, and the pointers of that nnode are used to determine whether that offset and size are cached in DRAM on the caching device. The same processor on the caching device that was used to read the NFS/RPC or other network file system headers of the read request then constructs a response to the request, including NFS/RPC headers that are written to a register on the network interface along with a pointer to the cached data. The network interface uses this information to DMA the data from the caching device and construct TCP/IP packets that are sent across the network to the client in response to the read request. As explained below, using the same processor for processing the response as that which processed the request reduces latency.

For the situation in which the file portion being requested by the client is not found in DRAM, the cache manager checks whether the SSDs 130-134 have the data. Although a few solid-state drives 130-134 are shown for clarity, many more may be employed. Upon finding that the nnode has pointers to the offset and size of the requested data stored in the SSDs, the data is copied to DRAM 105 before being sent out to the client as described above. Using the same processor for accessing the SSD as that which processes the request and the response may further reduce latency.

For the situation in which the file portion being requested by the client is not found in either DRAM 105 or the SSDs 130-134 of the caching device, the read request is forwarded from the caching device to the server. The server uses the filehandle of the read request to locate the file and sends the data from the offset back to the cache manager, which caches the data in its DRAM 105 along with sending it to the client. As explained below, the multiprocessor caching device uses the same processor for handling the request to the server and response from the server as that which processes the request from the client and the response to the client, which can provide dramatic reductions in latency.

Similarly, a client write request to the server for which a filehandle is found on the caching device may benefit from using the same processor for handling the write request to the server and response from the server as that which processes the write request from the client and the response to the client. In one embodiment, the response to the client may be provided by the caching device before a response from the server to the caching device has been received, after the cached data has been securely stored on the caching device, for example in fail-safe, non-volatile RAM on the caching device.

In addition to read and write requests, lookup requests from the client to the server may be cached on the caching device. For example, a client may call the server with a filehandle identifying a directory on the server and ask whether a particular file name is in that directory. In this case, the cache manger may create a lookup entry that is stored in a special cache buffer. Along with the file name, file path or other metadata returned by the server in response to the lookup request, any file data that is returned in response to the lookup request may be cached on the caching device.

As mentioned above, each of the logical processors of the caching device may execute a respective single process, which is stored as a respective single call stack. In this disclosure, the term single-stack refers to an embodiment in which a single process runs continuously on a given processor. This differs from the conventional processing model where multiple processes exist simultaneously. Note that, for a given processor, only one process can actually be running at any given time. This processor could be a virtual processor in a hyperthreaded processor, and/or a single core in a multicore processor.

A main difference between the conventional processing model used for networking and the single-stack embodiment involves the procedure that is employed when a given job needs to be suspended in order to wait for some asynchronous event—for example a DMA completion. In the conventional model, the current executing process goes to sleep. When the asynchronous event occurs, a corresponding wakeup is issued to cause the process to resume execution. The sleep function involves saving the entire state of the current running process and then having the processor begin or resume execution on a different process. This saving of state and switching to another process is commonly called a context switch.

Context switching is a relatively expensive operation due to the sheer volume of state involved with a process—The process state includes, among other things, the entire call stack (the layers of function calls which were processed to arrive at the current location), the values of all of the current registers, including the current instruction pointer, etc. A context switch might also require that the virtual memory map be reloaded. Once the state of the outgoing process is saved, the state of the incoming process must be loaded, which is essentially the exact same thing in reverse—loading the current register values, etc. The effect of doing this is that, when a particular job (for instance the processing of an NFS read request), running within the context of a particular process (for instance an NFS daemon), gets to a point where it can no longer proceed, (for instance, if it needs to wait for data to be DMA'd in from disk), it goes to sleep and is effectively frozen in place until a corresponding wakeup occurs. When the wakeup occurs, it continues forward as if nothing happened.

In the single-stack model of the current disclosure, there are no sleeps or wakeups, or corresponding context switches. To accomplish this, we store the state of a given job (an NFS read request for example) separately from the process itself. In addition, we use a separate mechanism (other than sleep/wakeup) to resume work on a pending job.

Consider for example an NFS read request from a client. If the data being requested with the NFS read is on disk, the processing of that request needs to be suspended while the data is DMA'd in from disk. As discussed above, this would conventionally be achieved by having the process, which is currently working on the read request, to go to sleep until the DMA completes, at which point it resumes execution on the request at the line of code following the call to sleep ( ). In the single-stack model, we simply set the pending request aside in memory, at which point the process returns back down the call stack and looks for other work to do, for example, another NFS request. Note that in this case, there is no limit to the number of pending requests in the system other than memory availability to store the pending requests. In the sleep/wakeup model, you can only have as many pending requests as there are processes available to work on them. In the single stack model, one embodiment employs a mechanism that may be termed a replay queue to resume processing on the suspended NFS read request when the DMA completes.

Using the replay queue in one embodiment, work is resumed on a suspended job essentially by feeding the pended NFS request back through at the top of the NFS layer as if it were a new request. Note that in this specific example, the job would go through the exact same sequence of operations as before, except that this time, instead of finding the requested data on disk, it would now find it in memory and be able to complete the operation. This is accomplished in one embodiment by simply maintaining a queue of "replayed" requests in memory. Requests are placed on this replay queue when the asynchronous event completes (the DMA in this example). Requests are taken off this queue by the mainloop in the course of looking for work to do. The mainloop is the heart of processing in the single-stack embodiment. Among the things that it does is to check the network for received data/NFS-requests, to check the SSD driver for completed SSD operations, and to check the replay queue for replayed operations.

As discussed above, there is a single process running per processor in the single-stack embodiment. As also discussed, to achieve CPU affinity in one embodiment, we arrange for all requests from a given client connection to be processed entirely by one processor. When both of these embodiments are used, any suspended operations must resume operation on the processor that effectively "owns them". This can be accomplished by maintaining a separate replay queue per processor. In one example a virtual processor ID field, which may be termed a core field, is maintained in the request itself so that, when a suspended request is placed on the replay queue, the mainloop can know which replay queue to place it on.

Figure 2:
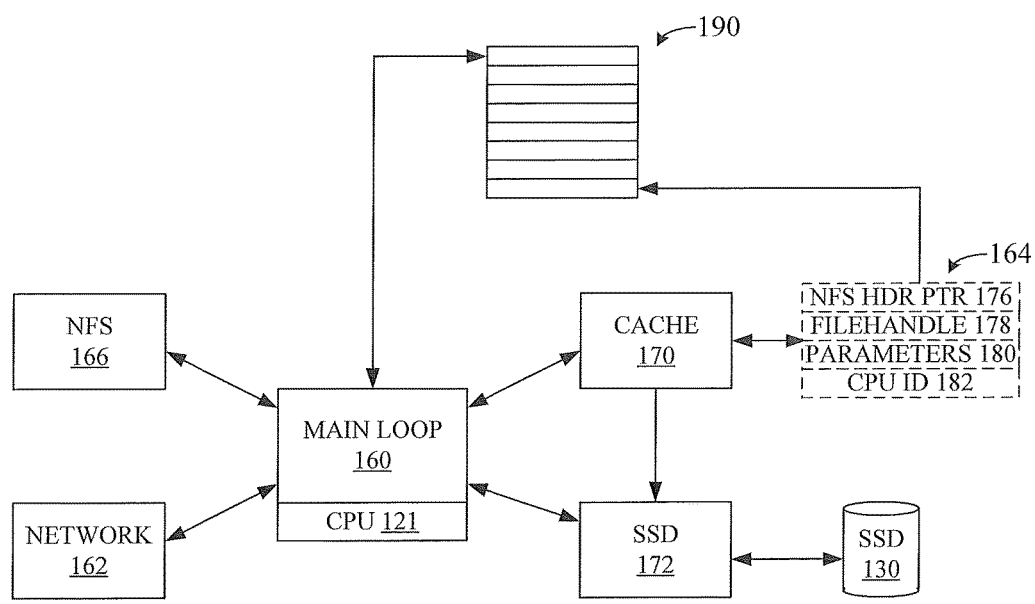
FIG. 2 is a schematic diagram of some entities polled by a mainloop of a processor of the caching device of FIG. 1.

With reference to FIG. 2, the mainloop 160 is shown running on logical processor 121, although the mainloop also runs on each of the other processors. The mainloop 160 checks several entities in a repeating cycle to find jobs for the processor 121 to work on. In one embodiment, mainloop 160 checks the network 162 to find received data events, checks NFS 166 event queue for NFS requests, checks SSD driver 172 for completed SSD operations, and checks a replay queue 190 for replayed operations. In another embodiment, received data events and NFS requests can be stored on the same event queue that is polled by mainloop 160.

For example, an NFS read request may be discovered by mainloop 160 checking an NFS 166 event queue, causing processor 121 to begin processing the request. Processor 121 running NFS program decodes the request to determine the filehandle and parameters of the request, such as that it is a read request and the length of the requested data, and builds an NFS data structure 164 for the request. In this example, data structure 164 includes a pointer to the NFS request header 176, the filehandle 178, the parameters 180 and a processor identifier 182 that indicates that processor 121 is handling the request. The filehandle and parameters of the request are used to determine whether the data requested exists in DRAM cache 170. If the data corresponding to that filehandle and parameters is found in cache 170, the NFS process adds to the NFS data structure a pointer to the data, and provides the data structure to the network interface for transmission of the header and data over the network. If the data is not found in cache 170, the NFS response job stops and a link to the NFS data structure is queued to the nnode for that filehandle. The cache manager requests the data from SSD driver 172, creating a DMA data structure including a link to the nnode. The mainloop at this time looks for other jobs to work on, such as other NFS requests.

When the data has been transferred by DMA from the SSD to the DRAM cache 170, the cache manager uses the link from the DMA data structure to find the nnode, and uses the link from the nnode to find the NFS data structure 164, which is then placed on replay queue 190. As noted above, replay queue 190 may be accessed by processor 121, and there is a different replay queue for each of the processors. Mainloop 160 periodically checks replay queue 190, and accesses data structures such as structure 164 in the order in which they were placed on the queue. When mainloop 160 pulls data structure 164 from the queue 190 it uses the information in the data structure 164 to replay the job of processing the read request, which can be completed now that the requested data is in the cache 170.

Figure 3:
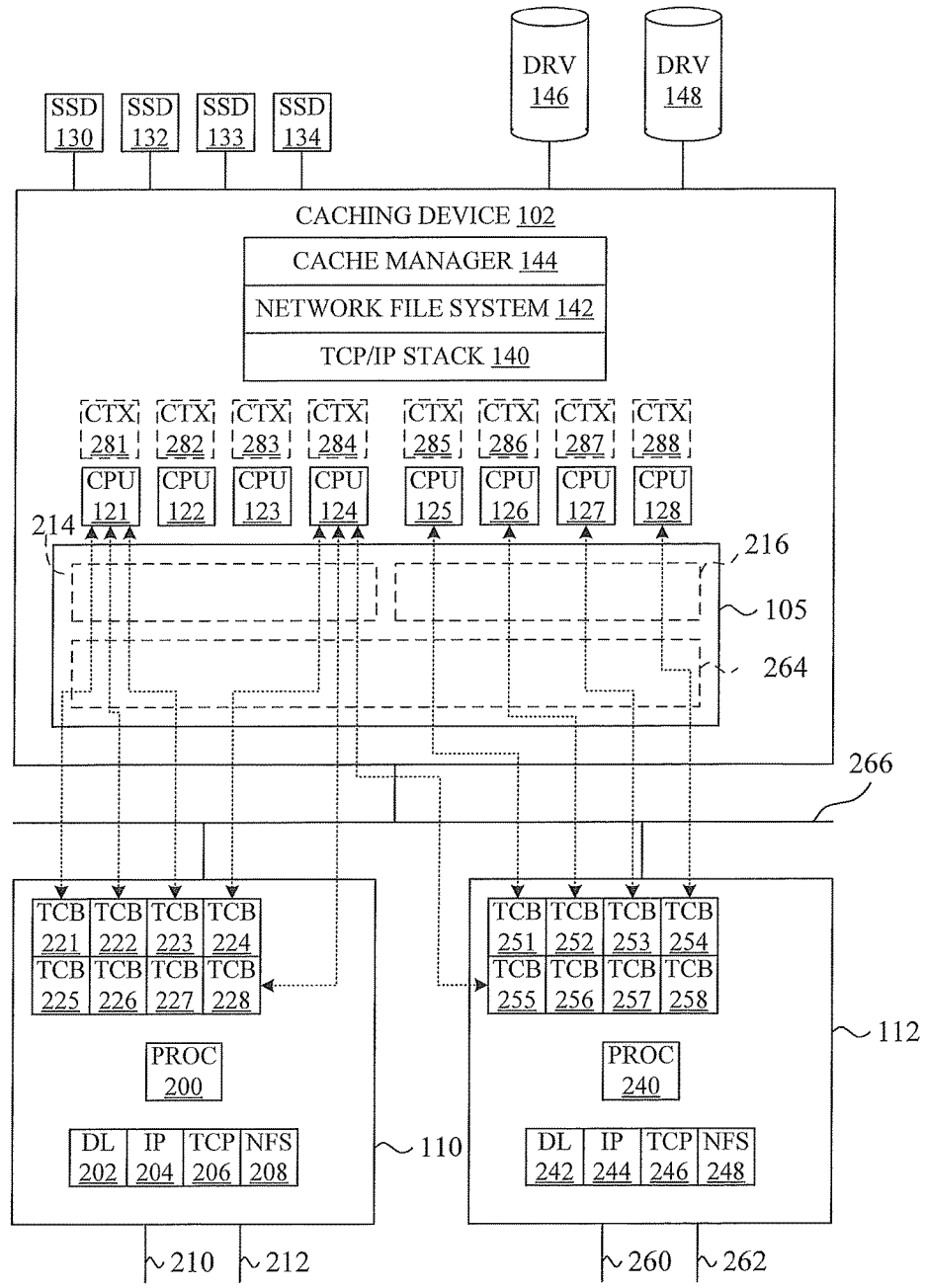
FIG. 3 is a schematic diagram of the caching device of FIG. 1 and a network interface for the caching device.

FIG. 3 is a schematic diagram of an embodiment of the caching device 102 of FIG. 1, coupled to network interfaces 110 and 112, which may be network interface cards (NICs), for example. Although two network interfaces are shown in this embodiment, more or less can be coupled to the caching device. Network interface 110 includes at least one processor 200 and hardware logic that processes received and transmitted network packets for protocol layers 1-4, including data link 202, network (e.g., IP) 204 and transport (e.g., TCP) 206 layers. In one embodiment, the processor 200 is a special purpose networking processor which may be included with the hardware logic on an application specific integrated circuit (ASIC). The hardware may also provide processing of some network file system (e.g., NFS) layer 208 functions, and/or certain NFS functions can be performed by processor 200. Although shown as separate hardware units, the processing of layers 202-208 may be as a stream or block of bytes without interruption or copying between layers for each network packet. In one embodiment, two physical layer connections to a network are provided by interface 110, the physical connections labeled 210 and 212. Although two physical connections are shown, more are possible and only one is necessary, preferably coupled to and compliant with an Ethernet link that can transfer at least ten gigabits of data per second.

In one embodiment, TCP processing is apportioned between the caching device 102 and network interface 110, with the caching device 102 performing more complicated functions such as setup and teardown of network connections, whereas the network interface 110 provides bulk data processing. Once a TCP connection is established by the caching device 102, the TCP control block (TCB) storing the connection is transferred to the network interface and maintained as one of perhaps thousands of TCBs 221-228 on NI 110. Network interface 112 similarly includes at least one processor 240 and hardware that processes received and transmitted network packets for protocol layers 1-4, including data link 242, network (e.g., IP) 244 and transport (e.g., TCP) 246 layers. The hardware may also provide processing of some network file system (e.g., NFS) layer 248 functions, and/or certain NFS functions can be performed by processor 240. As with NI 110, thousands of virtual connections such as TCBs 251-258 may be stored on NI 112, which includes two physical network connections 260 and 262.

Network file system processing may also be apportioned between the caching device 102 and network interface 110, with the network interface 110 identifying network file system headers within TCP payload data, separating the headers from any corresponding network file system data and storing those headers and data separately on the caching device via direct memory access (DMA). One of the processors on the caching device can then process a group or batch of those headers according to the network file system protocol, including storing the corresponding data in DRAM on the caching device for example according to filehandles for the NFS protocol.

An objective with this receive mechanism was to reduce the host CPU overhead by eliminating interactions with the network interfaces and trips through the host protocol processing stack, as compared to prior art mechanisms. Previously, Alacritech TCP (ATCP) offload design and the subsequent Microsoft Chimney TCP Offload Engine (TOE) design worked much in the same way with regard to receiving data, both of which employed the following steps. First, a receive segment would arrive at the TOE card, which would forward that segment, or a portion of that segment, to the driver running on the host. Next, the driver would "indicate" that segment to the software above it. In the case of Microsoft Chimney, this indication would travel through the NDIS layer, the TCP/IP layer, the TDI interface, and then ultimately to the application sitting above TDI. With each of these layers, there was some amount of processing overhead. In particular, the TCP/IP layer required that a spinlock was acquired for the connection to ensure that the state of the connection was still valid.

The application layer would do one of two things upon receiving this indicated data. If the amount of data indicated encompassed an entire session layer data unit (SDU, sometimes called PDU for protocol data unit), then the application layer could simply "accept" the data. If, however, the indicated data was merely a portion of a large SDU, then the application layer would respond by "posting" a network buffer back to the card. This posting of the network buffer included a corresponding trip down through TDI, TCP/IP, NDIS, to the network driver and then out to the card—each with associated overhead.

If a network buffer was posted, then a subsequent interaction with the card was required to complete the posted buffer back to the application—again through each of the layers mentioned above. It was discovered that the posting of this buffer had disadvantages as well as advantages. The advantage is that, by posting this buffer, the data can be moved from the card directly to its final resting place in host memory (otherwise the network data would have to be copied by the CPU from network buffers to the application buffer). The disadvantage is that there are three trips through the host stack and three interactions with the card—one for the initial indication, a second to post the buffer, and a third to complete the buffer. For large SDUs (more than 16 k) the zero-copy benefits far outweighed the interaction overhead. For smaller SDUs (less than 4 k), the extra trips through the stack negated the zero-copy benefits, and could even result in a loss in performance for very small SDUs (2 k).

In contrast, the receive mechanism disclosed herein provides all of the zero copy benefits without any of the interaction overhead described above. In one embodiment, the present inventors focused on the NFS application to improve both the implementation of the network card as well as the application layer software. Note that the previous Alacritech network interface card was designed to work with any application running on the Windows operating system. Along with other improvements discussed herein, the following changes were made compared to that prior receive mechanism. First, the card was modified to keep track of NFS SDU boundaries. Second, the card was modified to separate NFS headers from NFS payload, and to place headers and data into different buffers in host memory. Third, the host software was modified to bypass the layers between the driver and the application layer (NFS). Fourth, a polling mechanism was employed to eliminate interrupts. With these changes an NFS SDU, regardless of its size, can be passed to the host in a single event and NFS payload can be placed in application buffers without the need of a CPU copy.

Descriptions of embodiments that illustrate such modifications can be found in U.S. application Ser. No. 12/581, 342, filed Oct. 19, 2009, and U.S. Application No. 61/107, 439, filed Oct. 22, 2008, both of which are incorporated by reference herein as to the disclosure of apparatuses and methods for receiving network data including batch processing of network file system.

Figure 4:
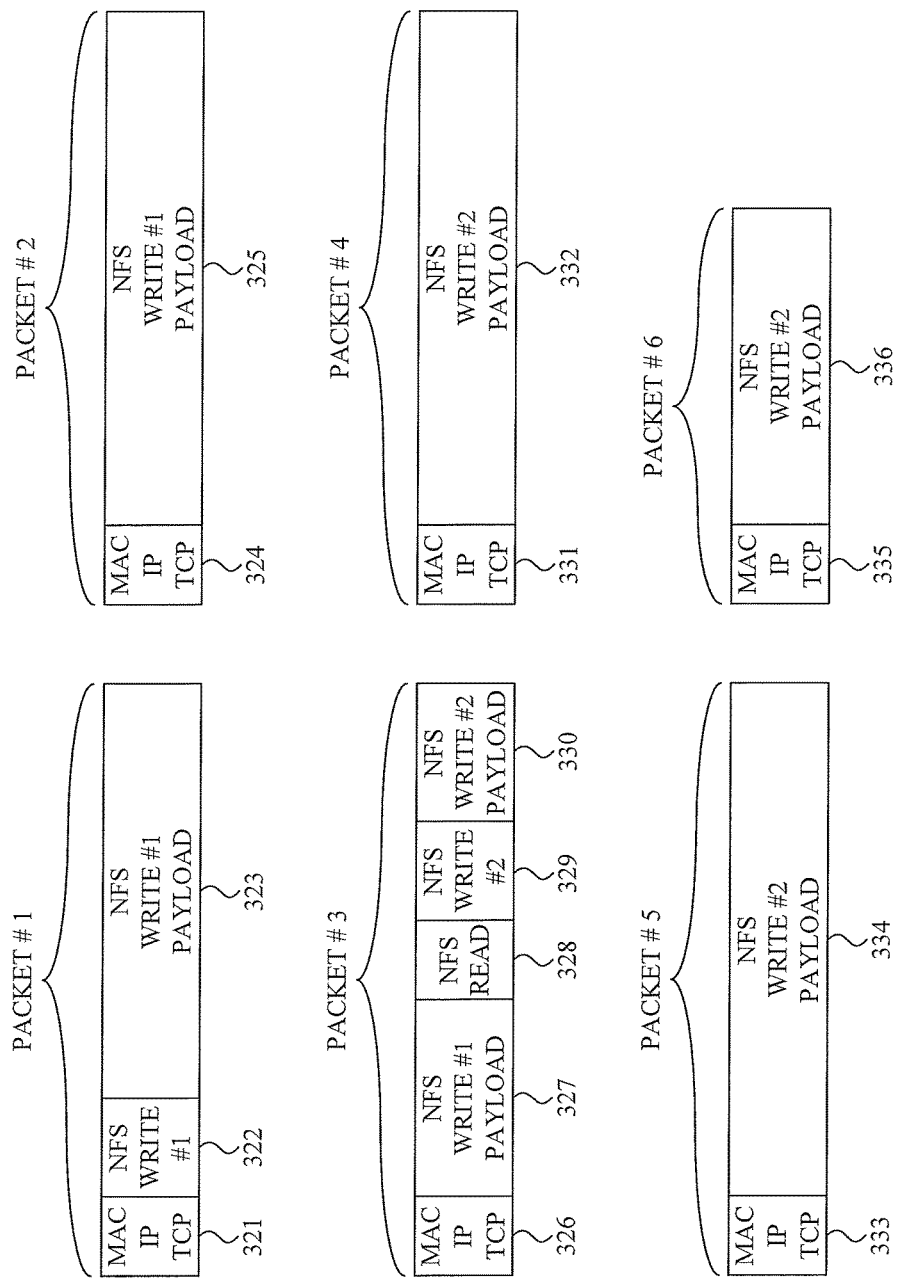
FIG. 4 is a schematic diagram of a plurality of packets being received by the network interface and caching device of FIG. 3.

FIG. 4 shows some received network packets that may be processed by the network interfaces and host caching device of FIG. 3. In the example shown in FIG. 4, three NFS Protocol Data Units (PDUs) for a particular TCP connection are being received by network interface 110. These PDUs include a NFS write request with 4 KB of application data, a NFS read request, and a subsequent 4 KB NFS write request. Assuming a standard Ethernet maximum transmission unit (MTU) size of approximately 1.5 KB and no IP or TCP options, the corresponding packets on the wire would appear as shown in FIG. 4.

Packet #1 includes MAC, IP and TCP headers 321 totaling 54 B, a variable-length NFS write request #1 session layer header 322 of perhaps 128 B, and the first 1412 B of the NFS write request #1 payload 323. Packet #2 includes MAC, IP and TCP headers 324 totaling 54 B, and the next 1460 B of the NFS write request #1 payload 325. Packet #3 includes MAC, IP and TCP headers 326 totaling 54 B, the last 1224 B of the NFS write request #1 payload 327, a variable-length NFS read request session layer header 328 of perhaps 128 B, the variable-length NFS write request #2 session layer header 329 of perhaps 128 B, and the first 140 B of the NFS write request #2 payload 330. Packet #4 includes MAC, IP and TCP headers 331 totaling 54 B, and the next 1460 B of the NFS write request #2 payload 332. Packet #5 includes MAC, IP and TCP headers 333 totaling 54 B, and the next 1460 B of the NFS write request #2 payload 334. Finally, packet #6 includes MAC, IP and TCP headers 335 totaling 54 B, and the remaining 1036 B of the NFS write request #2 payload 336.

Each of the packets has TCP payload data that begins immediately after the TCP header. Thus, for packet #1, the TCP payload data begins with NFS write #1 322, for packet #2, the TCP payload data begins with NFS write #1 payload 325, for packet #3, the TCP payload data begins with NFS write #1 payload 327, for packet #4, the TCP payload data begins with NFS write #2 payload 332, for packet #5, the TCP payload data begins with NFS write #2 payload 334, and for packet #6, the TCP payload data begins with NFS write #2 payload 336.

Thus, one can see that the first 4 KB write spans the first three packets (1412 bytes of the first, 1460 of the second, and 1224 of the third, totaling 4096 bytes). This places the subsequent NFS headers at offsets 1278 and 1326 into the third packet respectively. Then, the second NFS write request spans packets 3, 4, 5, and 6, again totaling 4096 bytes. Conventionally, processing of these packets would have the disadvantages mentioned above, that is, a tradeoff between multiple host-card interactions and multiple data copies.

Figure 5:
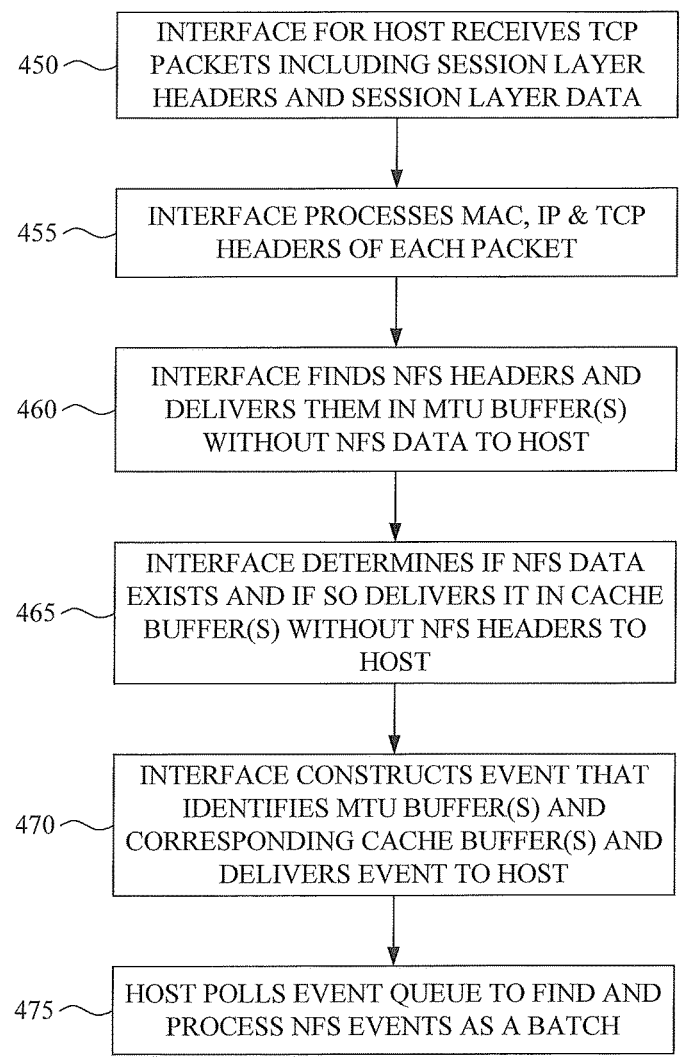
FIG. 5 is a flow chart of a method for receiving network data with the network interface and caching device of FIG. 3.

In contrast, the following sequence of events occurs in an embodiment shown in FIG. 5:

Step 1 (450): An interface such as network interface 110 for a host such as caching device 102 receives a plurality of TCP packets that include network file system session layer headers and session layer data. The interface has access to a first set of host memory buffers such as MTU buffers that can store NFS headers and a second set of host memory buffers such as cache buffers that can store NFS data.

Step 2 (455): As the packets arrive, the interface processes MAC, IP and TCP headers (321, 324, 326, 331, 333 and 335).

Step 3 (460): The interface locates the NFS headers (322, 328 and 329) within TCP data stream and delivers them, independently of the data, to the host caching device. To accomplish this step as well as the next step, when the interface receives the beginning of an NFS/RPC SDU, it first makes note of the entire NFS SDU size. This size is contained in the first 4-byte field of the RPC header known as the fragment field. The interface microcode can then determine the header length for the NFS request or reply. This length will vary based on a number of factors such as the type of NFS operation, whether it is a request or reply, variable length fields such as filehandles, etc. The interface then allocates a MTU buffer and DMAs the NFS/RPC header to this buffer in host memory. Note that it is possible for this header to straddle multiple packets.

Step 4 (465): The interface then determines if there is payload, which is the case if the total SDU length exceeds the header length. If there is, it then allocates a cache buffer and proceeds to DMA the NFS payload into one or more cache buffers which may, for example, be 4 k or 16 k in size. As with the header, this payload can, and likely will, cross multiple packets. For example, the interface DMAs the NFS payload (323, 325 and 327) into the cache buffer for write #1 and DMAs the NFS payload (330, 332, 334 and 336) into the cache buffer for write #2.

Step 5 (470): After the entire SDU has been placed in appropriate host buffers, the card constructs an "NFS Receive Event" and delivers it to the host to notify the host that a NFS SDU has been received. This event may, for example, be a 32-byte or 64-byte structure containing pointers to the buffer containing the NFS header, pointers to associated cache buffers, and header and total length fields. The event may be stored in a circular event ring or queue in host memory, and the event queue may be specific to the processor that processed the network file system headers, with similar event queues being specific to other processors. In one embodiment, the event queue only holds information about NFS Receive Events such as that described above. In another embodiment, the event queue may hold information about non-NFS events, such as receipt of a regular network packet for a non-NFS connection, or receipt of a network packet for a NFS connection that is running in slowpath.

Step 6 (475): The host periodically polls the event queue to determine whether any events such as the NFS Receive Event are stored in the event queue. For an embodiment in which only NFS events are stored in the event queue, the polling may be performed by the host NFS driver that then processes the NFS headers. For an embodiment in which the event queue holds other events such as receipt of a regular packet, the polling may be performed by the host device driver, which then calls the NFS layer for the NFS Receive Event, or calls the protocol stack for receipt of a regular packet.

In either of these cases, all interaction with the TCP stack on the host is avoided for fastpath NFS packets. There is no need to indicate a small amount of data up to the host and have the host return pointers to the network interface. Because the call from the driver to the NFS layer is only a few lines of code, in either of these cases the network interface is essentially communicating directly with the NFS software on the host.

Transmission of network data, like receiving network data, also bypasses the host TCP/IP stack 140. In one embodiment, this is accomplished in part by exposing the register space of a network card such as interface 110-114 to the NFS layer. This allows the network layer to construct a fastpath transmit command and hand it directly to the card by writing to one of the card registers. That is, in the case of an NFS transmit, which may involve either the forwarding by the caching device of an NFS request to the back-end server, or the sending by the caching device of a reply to a client, the NFS layer communicates directly with the network interface by filling in a command descriptor with pointers to the NFS header, and possible NFS payload, and notifies the card that there is NFS data to send by writing directly to a register on the card. This register is made visible to the NFS layer by simply storing the register's address in a global variable in the operating system.

In one embodiment, for the card to place NFS headers and NFS payload into different host locations, the caching device manages two separate buffer pools in host memory and provides these buffers to the network interface separately. These two buffer pools are referred to as "network" or "MTU" buffers for the headers, and "cache" buffers for the payload. The MTU buffer pool is composed of buffers large enough to handle an entire ethernet packet (1500 bytes for standard MTU, 9 k for jumbo). Note that the MTU buffer pool is used for both headers as well as "slowpath" traffic. For example, regular Ethernet frames can come in as a result of non-NFS traffic (i.e., ARP frames, HTTP frames, etc.), or as NFS traffic for a connection that is in slowpath (i.e., the TCB is on the host). In one embodiment, the cache buffer pool is composed of 16 k buffers. This pool is managed by the "cache manager" portion of the software which "loans" these buffers to the driver, which in turn populates the card.

As mentioned above, connection locks are traditionally used to ensure that multiple processors do not simultaneously change the state of a TCP connection. Such locking occurs in the Microsoft TCP chimney implementation on a per-I/O basis—even for offloaded connections. In one embodiment the inventors eliminated the need for this locking by delegating a given TCP connection to a single processor. This may be accomplished by using a hash of the four-tuple for each TCP connection (IP addresses and TCP ports). As also mentioned above, the caching device may manage an event queue per processor so that an NFS event is processed by the CPU that is associated with the TCP connection.

Referring again to FIG. 3, such a TCB association with only one of the host processors is illustrated by the dashed double arrows connecting processor 121 with TCBs 221, 222 and 223, and connecting processor 124 with TCBs 224, 228 and 255. Those dashed double arrows indicate that all communications (e.g., network file system headers and data) between the caching device and its network interface that correspond to TCBs 221, 222 and 223 are specific to host processor 121, and that all such communications between the caching device and its network interface that correspond to TCBs 224, 228 and 255 are specific to host processor 124. Stated differently, a strict affinity is maintained between the caching device CPUs 121-128 and the TCBs stored on network interface 110 or 112, such that there is only one caching device CPU that processes network file system communications corresponding to a given client TCB. However, there may be many network interface TCBs that correspond to a given caching device CPU, at least for the TCBs that are used for communication between the clients and clients.

TCBs 221-228 represent TCP connections with various clients, not shown in this figure. TCBs 251-258, on the other hand, represent TCP connections between the caching device and the server, also not shown in this figure. Like the client TCP connections, only one processor on the caching device is used for a given server TCP connection on the network interface. However, unlike the client TCP connections, a single server TCP connection on the network interface may be used for each respective processor on the caching device. For instance, the eight processors 121-128 of caching device 102 can each initialize and pass out to interface 112 a single TCP connection with the server 104, which are stored as TCBs 251-258. Although the server TCBs 251-258 are all shown disposed on interface 112 for ease of illustration, that need not be the case, and in fact it may be advantageous to distribute the server TCBs 251-258 between different interfaces 110-114 of the network interface for the caching device 102.

Caching device 102 sits logically between a client and back-end server. On a cache hit the caching device responds to client requests without any server involvement, but on a cache-miss, the client request must be forwarded to the back-end server. Similarly, when the server replies, caching device 102 forwards the reply back to the client. As noted above, every NFS TCP connection is delegated to one specific processor—this includes connections between the caching device and the back-end server. Since a client connection can be associated with any of the eight logical processors 121-128 in the system, if the caching device were to have a single connection to the back-end server, as is conventional, the odds are more than likely that the caching device would need to switch processors when forwarding a request from the client to the server. Caching device 102 instead opens a separate NFS connection per-processor to the back-end server. This allows the caching device to simply select the appropriate connection based on the current CPU when forwarding a request. A reply is received from the server by the caching device on the connection that the request was sent on, so it is guaranteed to already be on the appropriate connection, and thus, processed by the CPU associated with the original request from the client. In one embodiment, a socket structure for a TCP connection with a client can include an identification of the socket structure for the TCP connection with the server, which provides a quick and convenient means for mapping between the client TCBs and server TCBs.

In FIG. 3, caching device processor 124 is depicted as being associated with client TCBs 224 and 228 and server TCB 255. Although this is the only example shown in this figure for clarity of illustration, the affinity between a client TCB and one of the caching device processors, and the one-to-one correspondence between a server TCB and a caching device processor, together result in an association between each client TCB and a server TCB. That is, for each client TCB there is only one associated server TCB, although a server TCB can correspond to more than one client TCB.

In another embodiment, not shown, a plurality of mount points to the server may be employed, in which case there may be a single TCB on the network interface for each combination of a logical processor on the caching device and a mount point on the server, while each of the logical processors on the caching device corresponds to only one of the mount point TCBs. In another embodiment, not shown, a plurality of back-end servers may be employed, in which case there may be a single TCB on the network interface for each combination of logical processor on the caching device and mount point on the servers, while each of the logical processors on the caching device corresponds to only one of the plural server/mount point TCBs.

Thus, a single client connection might have traffic that is bound for server-A/mount-A, or server-A/mount-B, or server-B/mount-A, or server-B/mount-B, for example, each via a different server TCP connection. Stated more generally, for a given mount on a given back-end server, for each client TCB there is only one associated server TCB, although a server TCB can correspond to more than one client TCB.

The strict correspondence between a host processor and both a client TCB and a server TCB provides performance advantages for caching device 102. For example, data that is written by a client to the server via the caching device, and data that is read from the server by the client via the caching device, can all be processed by the same processor on the caching device, along with various control items such as requests and acknowledgements communicated for that data, all without locking or switching the processor. Moreover, the data being written or read may be temporarily stored in cache buffers local to that processor, and may be communicated for example by remapping rather than copying.

To better understand the benefits of this processor correspondence to client and server TCBs, some background information may be helpful. Every task performed by an operating system has associated context—i.e. which "thing" the task is being performed on. When a segment is processed by TCP, the context is the TCP connection (TCB). When a file system write operation is performed, the context is the file itself, and so on. Associated with these contexts are typically one or more data structures contained in memory which include fields about the state of the context. For instance, in the case of a TCP connection, this might be a control block with sequence numbers, while in the case of a file it might be an inode with file metadata information. In one embodiment, the caching device distributes such tasks to different processors based on the context that is being worked on.

The term "symmetric multiprocessing" (SMP) first appeared in the 1950s to describe a hardware architecture having multiple processors with access to the same memory. To make use of these processors, operating systems must be written in an SMP-safe manner. This is accomplished by allowing all of the processors to run simultaneously. When a process needs to be run, it is assigned to the next processor that becomes available. This model of allowing any processor to do any task on any context means that it is possible for two processors to be operating on the same context, and associated data structures, at the same time. This leads to two forms of contention, spinlock contention and cache line contention.

To understand spinlock contention, consider a situation in which two processors need to increment a value stored in memory. The process of doing so involves first reading the current value, incrementing it, and storing it back to memory. If two processors were to do this at the same time, the following could occur:

1) Processor 1 reads value x;
2) Processor 2 reads value x;
3) Processor 1 stores x+1;
4) Processor 2 stores x+1.

The resulting value stored in memory, given this sequence of operations, is now x+1, when it should be x+2. This is a simple illustration of what is commonly called a "critical region"—a region of code which must be protected with a spinlock in order to ensure that only one processor operates on a region of memory at a given time.

Spinlock contention results when multiple processors vie for a lock at the same time. When this occurs, the processors waiting for the lock simply spin until the lock is released. While this processor is spinning, no progress is being made on whatever task is being performed—that processor has an effective CPU clock rate of zero.

The regions protected by spinlocks vary. A well written operating system uses "fine-grained" locks, which protect relatively small regions of memory. For instance, a well written network stack would lock an individual TCP connection, but allow multiple processors to operate on different TCP connections simultaneously. Conversely, many early network stack implementations would protect the entire stack with a single lock (sometimes called a giant lock)—thus allowing only a single processor to perform networking operations at a given time. Some of these implementations are still used today.

Even when there isn't spinlock contention, there is a performance penalty associated with two processors modifying the same value in memory. When a processor references a particular value in memory, the cache line containing that value is read into the processor cache. So long as the cache line remains valid, any subsequent operations on that value can be performed on the cache line without having to go to memory. When two processors have the same value in their respective caches, and one processor modifies that value, the associated line in the other processor's cache becomes invalidated. As a result, the next reference to that value requires that the cache line be re-fetched. Relative to the processor speed, fetching a cache line is extremely slow. Historically the fetch of a cache line from memory meant that the processor would be stalled until the fetch completes. More recently, a number of processor optimizations have been made to alleviate this overhead—hyperthreading allows the processor to continue executing instructions in the form of another "virtual processor", and prefetch logic attempts to fetch cache lines ahead of when they are actually needed. Nevertheless, even in today's systems, fetching a cache line can stall a processor for up to 300 cycles and, as such, remains one of the leading causes of "idle" clock cycles in a multiprocessor system.

Just as chefs complain about there being too many cooks in the kitchen, the same is true of conventional multiprocessing implementations. With the existing model of allowing any processor to perform any task on any context, as the number of processors go up, the odds of the processors "bumping in to each other" also goes up. Ultimately they spend more time waiting for other processors to get out of the way than they do performing useful work. Measurement on the Linux kernel demonstrated that network throughput merely doubled when increasing the number of processors from 1 to 4. This scalability—the amount of increased performance per added processor—has typically been shown to level off around 8 processors, after which additional processors yield no increase in performance.

As recently as several years ago, an eight processor system would have been relatively uncommon. With the introduction of multicore processors, many home computers now have this many processors. A modest 2-processor, 4-core system with hyperthreading yields 16 virtual processors.

As mentioned above, NUMA splits memory into multiple regions, with some regions of memory closer to one processor than another. Properly written software can take advantage of this by ensuring that processors only reference memory that is close to them. In practice, however, this is difficult to accomplish. Consider, for example, the networking stack. If any processor is allowed to operate on any TCP connection, as is the case with nearly all operating systems in use today, then there will be instances when the control block associated with the TCP connection will reside in memory that is distant from the processor. In those circumstances, the cache miss penalty, which is already extremely high relative to the processor clock rate, is significantly worse with NUMA.

In one embodiment, the inventors abandoned the conventional model of allowing any processor to operate on any context. Instead, the caching device effectively binds a context (a TCP connection for instance) to a given processor. By ensuring that only one processor can operate on this context we can eliminate all spinlocks used to protect the associated data structures in memory. Furthermore, since only one processor modifies these data structures, cache line conflicts are eliminated. Lastly, by taking NUMA in to account we can allocate data structures for a given context close to the processor that it is bound to, ensuring that, in the rare event that there is a cache line miss, it can be fetched from memory close to the processor. In this embodiment, the conventional diminishing returns that occur with additional processors have been removed, and high performance caching systems with 32 and 64 processors are envisioned.

Referring again to FIG. 3, the caching device 102 has two physical processor chips, each of which has two cores, each of which is hyperthreaded, so that the operating system of the caching device sees eight logical processors, denoted as CPUs 121-128. Logical processors 121-124 may run on a first of the chips and logical processors 125-128 may run on a second of the chips. DRAM 105 is depicted as having a NUMA configuration, with a first memory portion 214 local to the first of the chips and to logical processors 121-124, and a second memory portion 216 local to the second of the chips and to logical processors 125-128. DRAM 105 also has a portion 264 that is local to I/O bus 266. Memory portions 214 and 216 may be used for MTU buffers, which contain network file system headers that are processed by processors 121-124 and processors 125-128, respectively. Memory portion 264 may be used for cache buffers, which hold network file system data.

Also depicted are processor contexts 281-288, which are an attempt to illustrate some contexts being handled by processors 121-128, respectively. The contexts 281-288 are found in their respective processors' cache memory, while local portions 214 and 216 of DRAM are available in the case of a cache line miss. Contexts 281-288 may include, for example, socket structures that correspond to TCBs on the network interface. Correspondence between TCBs on the network interface and processors on the caching device is depicted by dashed double arrows connecting those TCBs and processors, although the context a processor is handling may correspond to a given TCB at one time and not at another.

Thus, for example, TCBs 221-223 may correspond to CPU 121, TCBs 224, 228 and 255 may correspond to CPU 124, and TCBs 251, 252, 253 and 254 may correspond to CPUs 125, 126, 127 and 128 respectively. In this case, a write request from the client of TCB 223 may be TCP processed by interface 110, and separated into network file system headers and data, the former stored in MTU buffers of memory portion 214 and the latter stored in cache buffers of memory portion 264. Those network file system headers may be processed by CPU 121 handling context 281, which may at that time be a socket structure corresponding to TCB 223. The write request data may also be cached in one of the solid state drives 130-134 by CPU 121 running the cache manager 144. The write request may also be forwarded to the server, for example using TCB 222, which has been designated as the TCP connection between processor 121 of the cache manager and the server mount point, at which time the context 281 may be a socket structure corresponding to TCB 222.

A read request from the client via TCB 223 is handled by processor 121 and preferably responded to with data stored in memory portion 264, if that data is in DRAM 105. If the data requested is not found in DRAM 105, the cache manager 144 fetches the data from one of the SSDs, such as SSD 130, into memory portion 264 to respond to the request. If the data requested is also not found in the SSDs 130-134, the cache manager requests the data from the server via TCB 222. The data is received from the server via TCB 222, stored in memory portion 264 and transmitted to the client via TCB 223. Forwarding the data in memory portion 264 from the server to the client may be as simple as passing a pointer to the data to the network interface 110. In each of the above examples, restricting the processor and corresponding portion of memory that is used for a particular context can save copying, spin-locks and cache-line fetches, all of which could otherwise degrade performance. In fact, experimental caching apparatuses designed in accordance with the above description have been shown to cut latency in half and increase network cache IOPS several fold, with the caching device processors running well below capacity. In one example, such a system may offer a caching device with 48 gigabytes (GB) of DRAM and 4 terabytes (TB) of SSD memory, along with a 10 Gb/s intelligent NIC.

For the situation in which the network file system employed by a server is NFS, an issue arises as to how to provide file locks on the server to different clients that may access the same filehandle on a caching device. That is, a conventional NFS lock request from a client to a server includes the filehandle that identifies the file on the server, as well as a client address and process ID. However, when a caching device forwards a lock request to the server, the address is that of the caching device, rather than that of the client. That is, the server cannot tell which client the lock request came from, if the request has merely been forwarded from the caching device. In one embodiment this issue can be handled by maintaining a table of lock requests on the caching device, so that when a lock request is granted by the server, the caching device can return the grant to the correct client. In this case, the caching device provides redirection similar to network address translation to replace the caching device IP address with that of the client. The caching device may also maintain a callback table to notify clients when a locked file that had been requested is now free.

In one embodiment, plural caching apparatuses can work in concert to provide a global cache for a server that advertizes a relatively large file system to clients. Such a global cache, which may also be called a distributed cache, may employ multiple caching devices working together to cache a single back-end filesystem without duplicating data between the caches. A global cache may be used for example with scale-out NAS products such as server clusters that allow a single file system to provide petabytes of storage with a maximum throughput of, for example, hundreds of Gb/S. For such a file system, a single 4 TB caching device with a network interface composed of two 10 Gb/S NICs is insufficient. If multiple caching apparatuses were to be used in front of this file system without changes, the bandwidth would be increased, but the caching devices would all contain the same (hottest) data, which effectively limits their working set of data to the 4 TB of each of the individual caching apparatuses.

In one embodiment, cache content for a relatively large file system may be apportioned such that each caching device node in the global cache is uniquely responsible for a given file. Requests for a given file (or directory) that are received by a different node may in this case be forwarded to the node that owns the file. Each node in the global cache may mount the same back-end file system, and any client is allowed to mount that file system from any node in the global cache. In one embodiment, to balance client traffic across the nodes that comprise the global cache, a round-robin DNS may be employed.

To redirect requests or replies from one node in the cache to another node in the cache, in one embodiment each node may open an NFS connection for each virtual processor with each other node in the global cache. In this case the caching device processor maintains an NFS socket structure that corresponds to a TCB maintained on the network interface. To the destination node (ie the node whose local port is NFS), the peer will appear as any other NFS client. For example, with a caching device processor count of 16, this will result in 16*(n−1) sockets being established on each node node ID, where n is the number of nodes in the global cache. Each node in the global cache will have a unique node ID, which can be configured, for instance via a graphical user interface (GUI). At setup time, each node will need to know its own node ID, as well as its peers' node IDs, and be able to associate the peer node IDs with the corresponding inter-node sockets. For example, node-0 will need to know how to redirect a request that is owned by node-1.

In one embodiment, a means to deterministically distribute cache content across the nodes in the global cache is provided. It is desirable in this regard for the distribution to be relatively even, and for each node to be able to quickly determine the owner of a particular NFS request. One way to accomplish these objectives is to base the distribution on a hash of the filehandle (which includes directory handles). For example, a hash on the filehandle may be calculated initially and the lower bits of the hash may be used to determine the node ID. This calculation may occur once during lookup-miss or create time and then be encoded into an extended filehandle that is returned to the client. In this case, a caching device can immediately determine the node ID on subsequent requests involving that file or directory. It is also possible to save a larger portion of the hash so that, in the event of newly added nodes, the owner of the file or directory can be recalculated.

An advantage of this mechanism is that it should result in an even and more or less random distribution of files across nodes. That is also somewhat of a disadvantage when it comes to satisfying requests that involve both a directory and an underlying file. LOOKUP requests, for instance, need to be satisfied by both the node that owns the directory as well as the node that owns the file (this process is discussed below). In the event that those are two different nodes, it means a hop between nodes before the request can be satisfied. In light of this, it might be desirable to design a different distribution mechanism that results in a greater locality of directories and underlying files. Doing so while still ensuring an even overall distribution remains a challenge, however. The current disclosure assumes that a filehandle hash approach is used.

In this example, the process of redirecting a request to a peer works as follows. When a node receives a request, it determines based on the content distribution mechanism which node owns the request. If the request owner is a different node, then an atk-nfs-redirect function will be called to send that request to the appropriate node. This function behaves similarly to the above-described method that forwards requests to the back-end server with the exception that the request is sent to the peer using one of the inter-node sockets that was established during setup time as described above. The peer processes the request as if it were received from a client. In the event of a miss, the request is then forwarded to the back-end server and upon reply the cache data and/or metadata is updated accordingly. The reply is then sent back to the node which received the original request. When the original node receives this reply it forwards it to the original client. This is again analogous to the above-described forward-reply procedure except that in the peer forwarding case the cache is not updated with the contents of the reply since that was already done on the node that owns the file or directory.

As with forwarded requests, it is possible that a redirected request will go out into the ether and disappear (e.g., the peer gets struck by lightning after the TCP ACK). In one embodiment the caching device may save the pending command on the peer socket structure and employ a heartbeat on the socket structure. If it is then determined that the peer has disappeared, the socket is closed and all pending operations are simply freed. As with forwarded operations, this is believed to be safe to do because NFS clients will retry any lost operations. Note that this implies that there should not be any state maintained about the pending operation other than the pending request itself.

In most cases, the global cache may simply redirect client NFS requests and server responses between nodes. In some cases, however, it may be desirable to pass information between nodes that cannot be accomplished using existing NFS commands. For those circumstances, Alacritech NFS operation types are defined with corresponding header structures. These types exist beyond NFSPROC-NOOP (22), which is the largest existing NFS procedure type. For the sake of consistency, the remainder of the RPC header remains standard.

As noted above, certain requests require involvement from both the node that owns a directory, as well as the node that owns a file beneath it, for the case in which the two nodes are different. Examples of such requests include create, lookup, remove, and rename. In these instances, an extended NFS operation will be sent from the owner of the directory to the owner of the file to create, remove, update, or fetch nnode information on the peer.

Such internode communication may utilize the ability to reliably identify a unique nnode on a peer from a directory entry stored on the node that owns the directory request. In one example a (remote)nnodeid+generation_number+filehandlehash (as is stored in the dirent today) is used, with the addition of a node-id. In effect, this is a space-efficient "private, internal" filehandle. Note that in one embodiment effort will be made to avoid maintaining state between nodes other than the node ID itself. This means, for example, that the creation of a directory entry structure will be deferred until the reply from the peer with the node ID is received. Otherwise, a pending partially-filled directory entry structure would exist that would need to be pinned until the reply came back. Another embodiment may store a full (ATKized) file handle in a dirent. However, this increases the dirent size considerably, resulting in larger DRAM consumption for directory data, but may be useful in some cases.

In one embodiment, the originating NFS request that resulted in the creation of the extended NFS operation may be saved. An advantage to saving the originating request is that it may contain information that is needed after the extended operation completes (to create a directory entry for instance), and this would provide a convenient way of saving this information without having to copy it. A disadvantage of this approach is that, in the event of an orphaned extended NFS operation, the originating request needs to be located and freed along with the extended operation.

As will be recognized by those skilled in the art, the innovative concepts described in the present application can be modified and varied, and accordingly the scope of patented subject matter is not limited by any of the specific exemplary teachings given. While the invention has been particularly shown and described with reference to certain embodiments, it will be understood by those skilled in the art that various changes in form and detail may be made therein without departing from the spirit and scope of the invention. None of the description in the present application should be read as implying that any particular element, step, or function is an essential element which must be included in the claim scope. The scope of patented subject matter is defined only by the allowed claims. Moreover, none of these claims are intended to invoke paragraph six of 35 USC Section 112 unless the claims contain the words "means for" followed by a participle.

The invention claimed is:

1. An apparatus for caching client data stored on a network server on behalf of clients, the apparatus comprising:
    a caching device, the caching device including a plurality of processors each running a network file system above a Transmission Control Protocol (TCP) layer; and
    a network interface for the caching device, the network interface adapted to perform TCP processing for a plurality of TCP connections, including maintaining a TCP control block (TCB) for each of the TCP connections, each of the TCBs identified by local and remote IP addresses and TCP ports for which the local IP address is that of the caching device, wherein the remote IP address is that of a client for each of the TCBs that is a client TCB, and the remote IP address is that of the server for each of the TCBs that is a server TCB;
    wherein each client TCB is associated with only one server TCB, such that network file system data corresponding to that client TCB does not correspond to any of the server TCBs other than the one server TCB that is associated with that client TCB.

2. The apparatus of claim 1, wherein the caching device is configured such that a socket structure is stored on the caching device corresponding to each of the TCBs, and each of the socket structures that corresponds to one of the TCBs for which the remote IP address is that of a client contains an identification of a socket structure for which the remote IP address is that of the server.

3. The apparatus of claim 1, wherein each of the server TCBs corresponds to only one of the processors, and each of the processors corresponds to only one of the server TCBs.

4. The apparatus of claim 1, wherein each of the client TCBs corresponds to only one of the processors, and each of the processors corresponds to a plurality of the client TCBs.

5. The apparatus of claim 1, wherein the caching device includes a Non-Uniform Memory Architecture (NUMA) for the processors.

6. The apparatus of claim 1, wherein the network interface is adapted to separate received network packets into network file system headers and network file system data and to store the network file system headers on the caching device separately from the network file system data.

7. The apparatus of claim 6, wherein the network file system is adapted to poll a queue to determine whether any of the network file system headers have been stored.

8. The apparatus of claim 6, wherein the network file system is adapted to process a plurality of the network file system headers as a batch.

9. The apparatus of claim 1, wherein the caching device includes a cache manager that is adapted to communicate with the network file system but the caching device does not include a file system that has a namespace hierarchy.

10. The apparatus of claim 1, wherein each of the processors is adapted to run without any context switches.

11. The apparatus of claim 1, wherein each of the processors is adapted to access a queue that is dedicated to that processor in order to replay a job that had been suspended.

12. A method for caching data for a server, the method comprising:
    running, on a plurality of processors of a caching device, a network file system above a Transmission Control Protocol (TCP) layer; and
    maintaining, by a network interface for the caching device, a plurality TCP control blocks (TCBs), wherein each of the TCBs is identified by local and remote IP addresses and TCP ports for which the local IP address is that of the caching device and the remote IP address is that of a client or the server, such that the remote IP address is that of the client for each of the TCBs that is a client TCB, and the remote IP address is that of the server for each of the TCBs that is a server TCB;
    performing, by the network interface, TCP processing on network packets corresponding to the TCBs;
    dedicating, by the caching device, one of the plurality of processors for each of the TCBs, such that all network file system headers corresponding to the TCB are processed by the processor; and
    restricting all caching device processing of network file system headers corresponding to the TCB to one of the processors that corresponds to both a server TCB and a client TCB.

13. The method of claim 12, further comprising:
    storing, by the caching device, a plurality of server socket structures, wherein each of the server socket structures corresponds to a respective one of the server TCBs; and
    storing, by the caching device, a plurality of client socket structures, wherein each of the client socket structures corresponds to a respective one of the client TCBs, including maintaining an identification of a server socket structure with each client socket structure.

14. The method of claim 12, further comprising:
    dedicating, for each of the processors, a different one of the TCBs for which the remote IP address is that of the server.

15. The method of claim 12, further comprising:
    running each of the processors without any context switches.

16. The method of claim 12, further comprising:
    accessing, by each of the processors, a queue that is dedicated to the processor; and
    replaying by the processor, using information from the queue, a job that had been suspended.

* * * * *